US006523920B2

(12) United States Patent
Wade et al.

(10) Patent No.: US 6,523,920 B2
(45) Date of Patent: Feb. 25, 2003

(54) COMBINATION INK JET PEN AND OPTICAL SCANNER HEAD AND METHODS OF IMPROVING PRINT QUALITY

(75) Inventors: John M. Wade, Poway, CA (US); Jaime E. Bohorquez, Escondido, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/773,984

(22) Filed: Feb. 1, 2001

(65) Prior Publication Data

US 2002/0101469 A1 Aug. 1, 2002

(51) Int. Cl.[7] ............................ B41J 2/14; H04N 1/034

(52) U.S. Cl. ............................... 347/3; 347/19; 347/47; 358/472

(58) Field of Search ................................ 347/3, 19, 14, 347/16, 47; 358/502, 472

(56) References Cited

U.S. PATENT DOCUMENTS

| | | | | | |
|---|---|---|---|---|---|
| 4,630,076 | A | * | 12/1986 | Yoshimura | 347/43 |
| 4,747,655 | A | * | 5/1988 | Shirasaki | 385/36 |
| 4,809,080 | A | * | 2/1989 | Kotani et al. | 358/472 |
| 4,963,882 | A | * | 10/1990 | Hickman | 347/40 |
| 5,070,410 | A | * | 12/1991 | Hadley | 358/472 |
| 5,250,956 | A | | 10/1993 | Haselby et al. | 347/19 |
| 5,278,584 | A | * | 1/1994 | Keefe et al. | 347/47 |
| 5,289,208 | A | | 2/1994 | Haselby | 347/19 |
| 5,297,017 | A | | 3/1994 | Haselby et al. | 347/19 |
| 5,469,198 | A | | 11/1995 | Kadonaga | 347/41 |
| 5,659,648 | A | * | 8/1997 | Knapp et al. | 385/129 |
| 5,757,393 | A | * | 5/1998 | Suzuki | 347/16 |
| 5,825,378 | A | * | 10/1998 | Beauchamp | 347/19 |
| 5,841,448 | A | * | 11/1998 | Moriyama et al. | 347/19 |
| 5,975,674 | A | * | 11/1999 | Beauchamp et al. | 347/19 |
| 5,992,973 | A | * | 11/1999 | Wen | 347/19 |
| 6,158,850 | A | * | 12/2000 | Cook | 347/85 |
| 6,286,927 | B1 | * | 9/2001 | Taneya et al. | 347/19 |
| 6,371,591 | B1 | * | 4/2002 | Conta et al. | 347/19 |

* cited by examiner

*Primary Examiner*—John Barlow
*Assistant Examiner*—Blaise Mouttet

(57) ABSTRACT

A housing is configured for removable insertion into a reciprocable carriage of a printer. A thermal ink jet print assembly is mounted in the housing and includes a nozzle plate for forming a plurality of ink dots on a print media adjacent to the housing. A light source is mounted in the housing for illuminating the print media adjacent to the housing. A sensor is mounted in the housing for receiving light reflected from the print media and generating electrical signals representative thereof. The combination inkjet pen and optical scanner reduces the parts count, cost and complexity associated with optical document scanning by incorporating this capability into the pen of a thermal ink jet printer. It also permits the monitoring of dot position, dot size and/or spectral information in a thermal ink jet printer in order to make nozzle firing command corrections and improve print quality during printing. Methods are also disclosed for determining whether a sheet of print media is compatible with the ink of a thermal ink jet printer and for determining the incremental paper advance distance through a thermal ink jet printer to allow adjustments that will optimally nest the print swaths.

10 Claims, 3 Drawing Sheets

COMBINATION INK JET PEN AND OPTICAL SCANNER HEAD AND METHODS OF IMPROVING PRINT QUALITY

BACKGROUND OF THE INVENTION

The present invention relates to computer peripheral equipment in general, and more particularly, to thermal ink jet printers and optical scanners.

Thermal ink jet print cartridges are extensively utilized in printers attached to personal computers and in fax machines. They are also sometimes referred to as "pens" and provide good quality print and fast dry time on a variety of print media including common papers. Thermal ink jet print cartridges enable non-contact printing of both color and black and white text, numbers and graphic images, eliminating printer failures due to friction wear and foreign body interference. Their self-contained design and direct printer interconnect allows for fast, simple replacement, while avoiding the necessity for ribbons, pumps, etc. Thermal ink jet print cartridges are relatively small and virtually silent in operation. They have relatively low power consumption and EMI emissions, and represent an inexpensive alternative to laser print cartridges.

A conventional thermal ink jet print cartridge has an injection molded plastic rectangular outer housing with suitable projections and/or notches for precision registration in a transversely reciprocating carriage of a printer. The plastic housing may include an ink reservoir or the print cartridge may be a so-called "off axis" print cartridge that has a stationary ink supply connected by a flexible hose to the moving print cartridge. A nozzle plate on the outside of the housing of the thermal ink jet print cartridge has a plurality of nozzle orifices. Underneath each orifice is a firing chamber or ink ejection cavity commonly fed from a plenum. Ink is expelled through each nozzle utilizing a corresponding resistor element which rapidly heats a minute quantity of ink in response to an energizing signal controlled by a microprocessor in the printer. The minute quantity of ink is boiled, creating a bubble that ejects an adjacent ink droplet out of an orifice to form a dot on the print media. When the bubble collapses, ink immediately refills the firing chamber from the plenum. By rapidly firing ink droplets from various nozzles in a controlled pattern, as the print cartridge reciprocates transversely and the paper advances longitudinally, alphanumeric characters and/or graphic images can be printed. Separate black ink and color ink thermal ink jet print cartridges are sometimes used in the same printer. The full spectrum of colors can be formed on the print media by using combinations of different colors of ink, for example cyan (C), magenta (M), yellow (Y) and black (K), according to well known techniques.

Optical scanners are commonly employed in facsimile machines to convert text and graphics into digital information that can be communicated, for example, over phone lines and wireless networks. Typically a facsimile machine includes a stationary light source and a stationary optical sensor that both extend across the width of the document feeding path. Text and graphics are scanned as a document is propelled longitudinally through the facsimile machine. More recently flat bed scanners have become popular peripheral devices used with personal computers. Typically a document is placed on, or automatically fed to, a large horizontal glass or transparent plastic platen. An optical scanning head or bar that extends across the entire width of the platen reciprocates longitudinally over the stationary document to generate a very high resolution digital image that is processed and stored in the personal computer.

U.S. Pat. No. 4,583,126 of Stoffel discloses a scanner incorporating a monolithic image read bar positioned above the paper path and an ink jet print bar positioned below the paper path to allow copying to be performed substantially simultaneously with the reading of an original document.

U.S. Pat. No. 5,980,010 of Stephenson discloses a printer that is attached over the LCD display of an electronic camera. A separate scanning head and a separate ink jet print head are mounted to opposite sides of a carriage so that the displayed image can be scanned and printed substantially simultaneously. There is no need to illuminate the image being scanned since the device relies upon the light emitted by the LCD display.

U.S. Pat. No. 5,289,208 of Haselby discloses a inkjet printer in which an optical sensor separate from the pens but mounted on the reciprocating carriage includes a quad photo-diode detector. The outputs of the detector are indicative of the horizontal positions of vertical test lines imaged on the detector in conjunction with horizontal alignment correction, as well as the vertical positions of horizontal test lines imaged on the detector in conjunction with vertical alignment correction.

An ink jet printer has been commercialized that allows an optical scanner head to be swapped into the carriage for the pen. This is cumbersome and time consuming, especially since alignment must be performed after each device is snapped into the printer carriage. In addition, with this type of ink jet printer it is not possible to substantially simultaneously print and scan for purposes of making adjustments "on the fly" to improve print quality.

It would be desirable to reduce the parts count, cost and complexity associated with optical document scanning by incorporating this capability into a thermal ink jet printer. It would also be desirable to monitor dot position, dot size and/or spectral information in a thermal ink jet printer in order to make corrections and improve print quality. At present thermal ink jet printers are commercially available that prompt the user to align a new cartridge upon insertion into the printer. This alignment involves a tedious process of printing rows of vertical test patterns and then having the user view the vertical test patterns. The user then clicks on response buttons on the personal computer screen corresponding to the printed test patterns that appear to be the most linear. The user must then confirm that a subsequently printed multi-color cross-shaped test pattern is acceptable.

SUMMARY OF THE INVENTION

It is therefore an object of the present invention to reduce the parts count, cost and complexity associated with optical document scanning by incorporating this capability into an otherwise conventional thermal ink jet printer.

It is another object of the present invention to provide a combination inkjet pen and optical scanner head that can be removably inserted into a reciprocating carriage in a document transport.

It is still another object of the present invention to monitor dot position, dot size and/or spectral information in a thermal ink jet printer in order to make corrections and improve print quality.

The present invention provides a combination ink jet pen and optical scanner head. A housing is configured for mounting on a carriage of a printer. A thermal ink jet print assembly is mounted in the housing for forming a plurality of ink dots on a print media adjacent to the housing. A light source is mounted in the housing for illuminating the print media adjacent to the housing. A sensor is mounted in the housing for receiving light reflected from the print media and generating electrical signals representative thereof.

The present invention also provides a method of improving print quality in a thermal ink jet printer by mounting a combination pen and optical scanner head on a carriage of a printer for reciprocation along a scan axis. A sheet of print media is propelled through the printer along a paper axis. A predetermined test pattern of dots of different ink colors is printed onto the print media using the combination pen and optical scanner head or another pen also mounted on the carriage. Predetermined dot position, dot size and/or spectral information is compiled by scanning the location, size and color of the dots of the test pattern using the combination pen and optical scanner head. Predetermined ink jet firing signals are corrected in accordance with pre-programmed parameters based on the compiled dot position, dot size and/or spectral information in order to improve print quality.

The present invention also provides a method of scanning a document with a pen for facsimile transmission or storage and printing with the same pen.

The present invention also allows a pre-printed media-type identifier, such as a bar code, to be read by a printer to determine if the media-type is compatible with the pen of a thermal ink jet printer.

The present invention also enables a method of determining the incremental paper advance distance through a thermal ink jet printer to allow for adjustments that optimally nest the print swaths.

DESCRIPTION OF THE PREFERRED EMBODIMENTS

Figure 1:
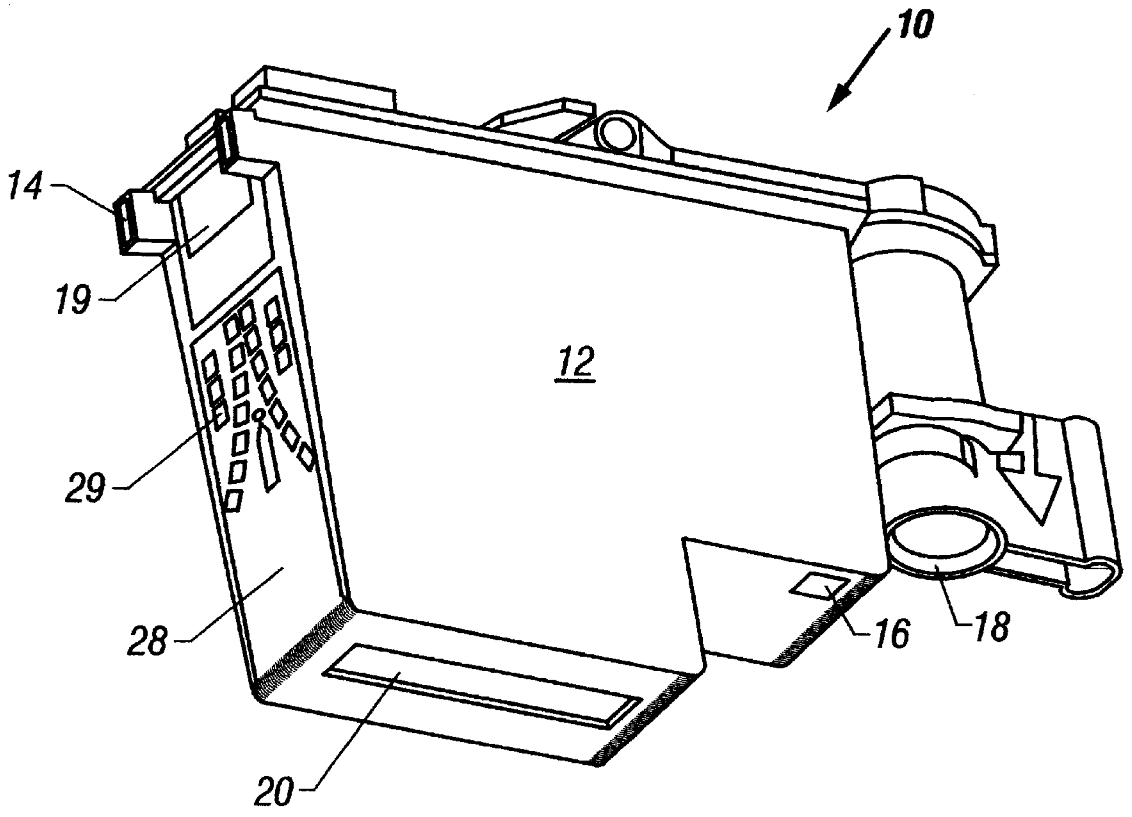
FIG. 1 is a perspective view of a combination ink jet pen and scanner head in accordance with a preferred embodiment of the present invention.

Referring to FIG. 1, a combination ink jet pen and scanner head 10 has an injection molded plastic rectangular outer housing 12 with suitable datums 14 and 16 that provide a projection and notch, respectively, for precision registration of the housing 12 in single receptacle formed in a transversely reciprocating carriage of a printer (not illustrated). The carriage removably receives the pen and reciprocates the pen transversely along a so-called "scan axis" while the paper is advanced longitudinally along a so-called "paper axis." Motor driven transports that use encoder wheels and micro-electronic drive circuitry have been highly developed, by the Hewlett-Packard Company, and others, for use with ink jet pens and need not be described in detail herein.

The combination inkjet pen and scanner head 10 utilizes a stationary ink supply (not shown) connected to a flexible hose (not visible). A male needle (not shown) mounted to the rear end of the housing 12 is concealed by a removable protective cover 18. A female connector (not illustrated) on the hose mates with the male needle. While an off-axis pen is shown, the present invention could also be implemented in a pen having its own internal ink reservoir. The pen need not be removable from the carriage but could be permanently mounted thereon.

An EEPROM 19 mounted to the housing 12 is used to store, for example, information about the particular cartridge read by the microprocessor of the printer, such as data accumulated during factory calibration. This stored data can be used by the printer to ensure optimum print performance.

Figure 2:
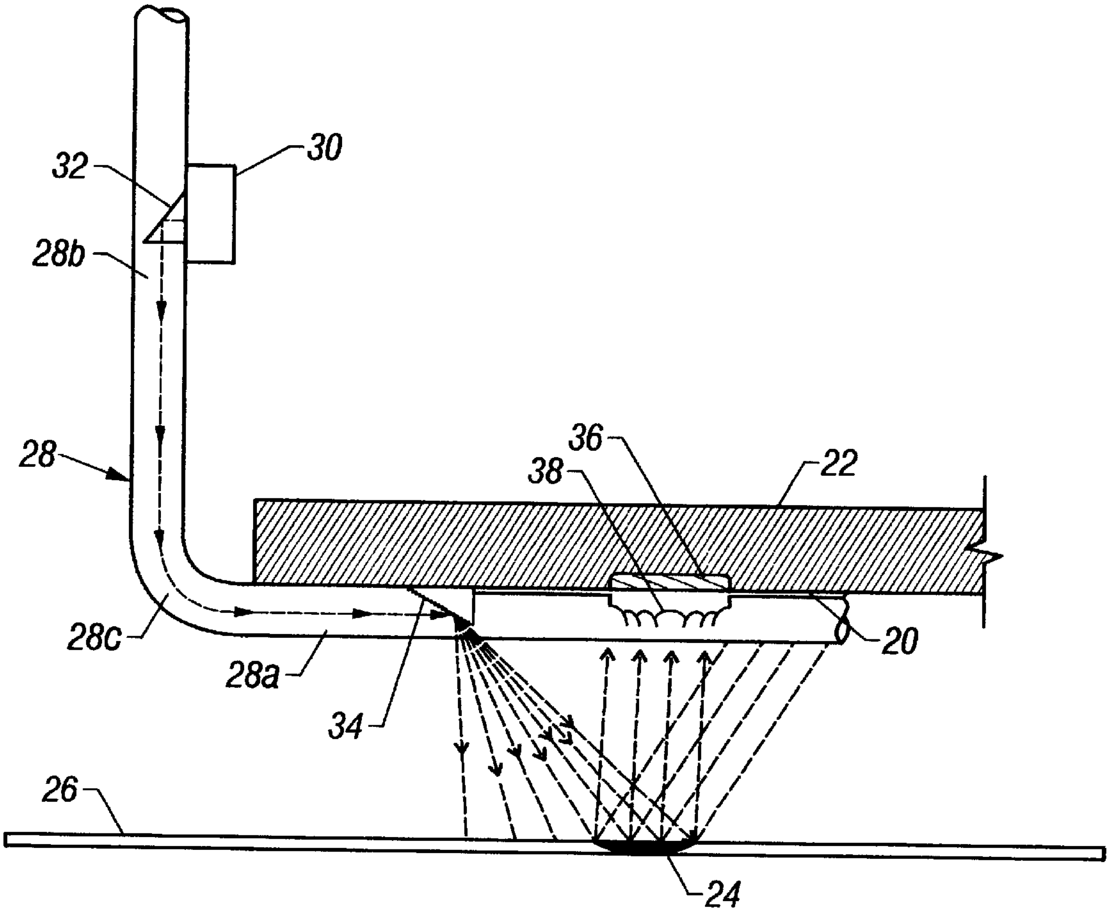
FIG. 2 is a diagrammatic side view of a portion of the preferred embodiment of FIG. 1.

A nozzle plate 20 (FIG. 1) on the outside of the housing 12 of the combination ink jet pen and scanner head 10 has a plurality of nozzle orifices (not visible in FIG. 1). Above each orifice is a firing chamber or ink ejection cavity commonly fed from a plenum (not illustrated). The nozzle plate 20 is part of a thermal ink jet print assembly that is also partially formed on a silicon chip or substrate 22 (FIG. 2). Details of the thermal inkjet print assembly are described in numerous issued U.S. patents assigned to the Hewlett-Packard Company. See also pending U.S. patent application Ser. No. 09/428,145 filed Oct. 27, 1999 of Sleger et al., assigned to the Hewlett-Packard Company, the assignee of the subject application. The entire disclosure of application Ser. No. 09/428,145 is hereby incorporated by reference.

Ink droplets can be expelled through each orifice of the nozzle plate 20 utilizing a corresponding resistor element (not illustrated) which rapidly heats a minute quantity of ink in response to an energizing signal controlled by a microprocessor in the printer. The minute quantity of ink is rapidly boiled, creating a bubble that ejects an adjacent ink droplet out of an orifice to form a dot 24 (FIG. 2) on the sheet of print media such as paper 26. When the bubble collapses, ink immediately refills the firing chamber from the plenum. By rapidly firing ink droplets from various nozzles in a controlled pattern, as the combination pen and scanner head 10 reciprocates transversely along the scan axis and the paper 26 advances longitudinally along the paper axis, alphanumeric characters and/or graphic images can be printed on the paper 26. See for example U.S. Pat. No. 5,250,956 of Haselby et al.; U.S. Pat. No. 5,297,017 of Haselby et al.; and U.S. Pat. No. 5,469,198 of Kadonaga, all assigned to the Hewlett-Packard Company, the entire disclosures of all which are hereby incorporated by reference. Thermal ink jet print assemblies such as that incorporated into the combination pen and scanner head 10 are capable of expelling ink droplets at extremely high rates, e.g. twenty to fifty kilohertz. The full spectrum of colors can be formed on the paper 26 by using combinations of different colors of ink, for example cyan, magenta, yellow and black, according to well known techniques.

Referring to FIG. 2, the silicon chip 22 is mounted on one leg **28*a* of an L-shaped flex circuit board 28 made of a transparent plastic material such as KAPTON®. The leg 28*a* of the flex circuit board 28 extends parallel to the paper 26 and forms one exterior surface of the housing 12. The other leg 28*b* of the flex circuit board 28 extends orthogonal to the paper 26 and forms another exterior surface of the housing 12. The nozzle plate 20 is preferably a section or region of the leg 28*a* of the KAPTON flex circuit board 28 through orifices have been drilled with an excimer laser beam. By way of example, the nozzle plate 20 may have five hundred and twenty-four separate nozzle orifices. Interconnect circuitry formed on the leg 28*a* of the flex circuit board 28 around the nozzle plate 20 connects to the circuitry formed on the silicon chip 22**.

A plurality of conductive pads 29 (FIG. 1) are formed on the flex leg **28*b* for providing electrical interconnects with corresponding contacts in the printer carriage. One or more light sources such as LED 30 are mounted on the leg 28***b* of the flex circuit board 28. Other suitable light sources include electro-luminescent devices, laser diodes and miniature flourescent lights. Light from the LED 30 is transmitted through the transparent flex circuit board 28 which functions as a light pipe to illuminate the paper 26 adjacent to the exterior surface of the housing 12 in which the nozzle plate 20 is formed.

The excimer laser beam is also be used to ablate or vaporize portions of the flex circuit board 28 to form first and second light reflecting ramps 32 and 34 (FIG. 2). The first ramp 32 is immediately adjacent the LED 30 and reflects light emitted by the LED 30 ninety degrees so that the light travels down the leg 28*b*, around the corner 28*c* and down the leg 28*a* to the second ramp 34. The second ramp 34 reflects light onto the region of the paper 26 opposite the exterior surface of the housing 10 in which the thermal ink jet assembly (including nozzle plate 20 and silicon chip 22) is mounted. The path of travel of the light from the LED 30 through the KAPTON flex circuit board 28 is illustrated diagrammatically by the L-shaped line of arrows in FIG. 2. The angled surface of the second ramp 34 may be stepped to form a fresnel lens to achieve the desired diffusion pattern diagrammatically illustrated in FIG. 2 by the diverging dashed lines and arrows.

As shown in FIG. 2 by the upwardly pointing dashed lines and arrows, the light projected from the combination pen and scanner head 10 and is reflected back to its downwardly facing exterior surface. A CMOS light sensor 36 is formed in the active side of the silicon chip 22. The light sensor can be inexpensively formed during the same manufacturing process that produces the thin film thermal inkjet assembly. See U.S. Pat. No. 6,111,300 of Cao et al. assigned to Agilent Technologies, U.S. Pat. No. 6,018,187 of Jeremy A. Theil et al. assigned to Hewlett-Packard Company and U.S. Pat. No. 5,969,399 of Frederick A. Perner assigned to the Hewlett-Packard Company, the entire disclosures of all of which are hereby incorporated by reference. The sensor of the aforementioned U.S. Pat. No. 6,111,300 of Cao et al. permits the use of a single white light source and the translucent color of the KAPTON circuit board 28 can thereby be accommodated. The patented sensor of Cao et al. comprises a multiple color detection elevated pin photo diode active pixel sensor. The diode is electrically connected to a first doped region of a substrate. The diode conducts charge when the diode receives photons have a first range of wavelength. The substrate includes a second doped region, which conducts charge when receiving photons having a second range of wavelengths. The photons having the second range of wavelengths pass through the diode substantially undetected by the diode. The substrate includes a doped well within the substrate, which conducts charge when receiving photons having a third range of wavelengths. The photons having a third range of wavelengths pass through the diode substantially undetected by the diode.

A second fresnel lens 38 is formed in the flex circuit board leg 28*a*, using the same excimer laser ablation technique, before the silicon chip 22 is mounted thereon. The second fresnel lens 38 is located immediately below the sensor 36. The lens 38 captures the collimated light rays and transmits them to the light sensor 36.

The combination pen and scanner head 10 preferably includes a plurality of LEDs (not illustrated) in addition to the LED 30, each emitting light at a predetermined wavelength suitable for detecting the corresponding ink dyes or pigments for each color. By way of example, red, green and blue light emitting diodes may be utilized. Similarly, the combination pen and scanner head 10 could include a plurality of light sensors but the lone CMOS light sensor 36 will suffice. The sensor 36 detects the presence of a dot 24 on the paper. By calibrating the outputs of the sensors when light is reflected only off of clean white paper, the position, size and color of each dot can be deduced.

The combination pen and scanner head 10 illustrated in FIGS. 1 and 2 may be used in an otherwise conventional thermal ink jet printer having suitable firmware that permits the same to operate in a scanning mode. Documents with pre-printed text and/or graphics can be fed through the printer and scanned to provide a digital image file of the document in PDF, TIFF or other standard graphic format. This digital image file can be transmitted to a personal computer for storage or further processing. Alternatively, where the digital image is created in Group III or other standard facsimile format, it may be transmitted via a modem over the phone lines. The combination pen and scanner head 10 reduces the parts count, cost and complexity associated with optical document scanning by incorporating this capability into a conventional thermal ink jet printer.

Figure 3:
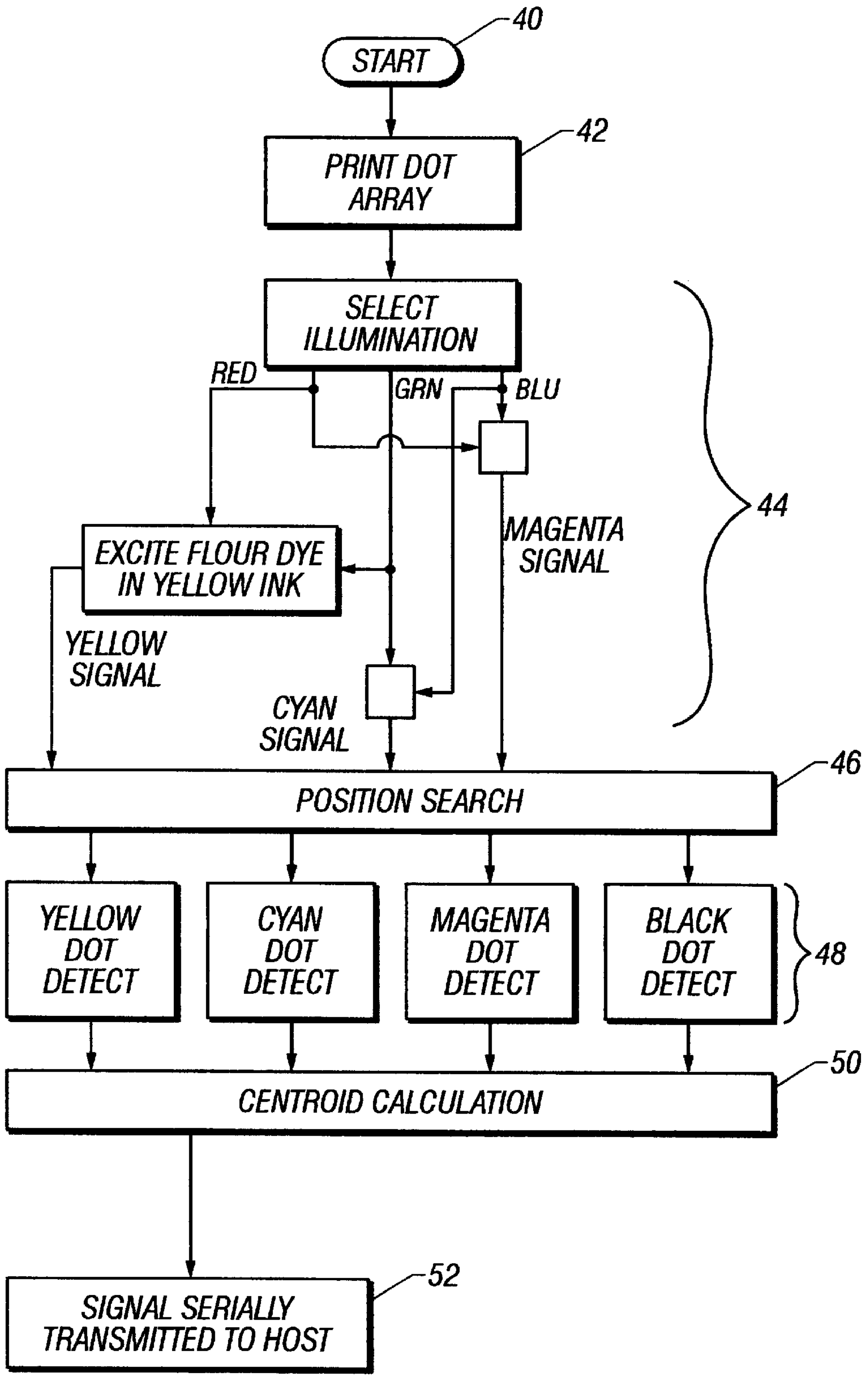
FIG. 3 is a flow diagram of a print quality adjustment method of an otherwise conventional thermal ink jet printer that utilizes the combination ink jet pen and scanner head of FIGS. 1 and 2 to monitor dot position, dot size and/or spectral information in order to make corrections and improve print quality.

The combination pen and scanner head 10 of FIGS. 1 and 2 may also be used in an otherwise conventional thermal inkjet printer equipped with suitable firmware for improving print quality. FIG. 3 is a flow diagram of a print quality adjustment method of an otherwise conventional thermal ink jet printer that utilizes the combination ink jet pen and scanner head of FIGS. 1 and 2 to monitor dot position, dot size and/or spectral information. In a first step 40 the method is initialized by the microprocessor of the printer. In the next step 42 a predetermined multi-color dot array is printed on the paper 26. In the next step 44, red, green and blue LEDs in the combination pen and scanner head 10 are selectively energized. This is only necessary where the preferred embodiment of the combination pen and scanner head 10 is utilized due to its use of the KAPTON flex circuit board 28 and its semi-transparency. It is desirable to excite flourescent dye in the yellow ink to aid in the detection of a yellow dot. The microprocessor of the printer performs a position search algorithm in step 46 using signals from the light sensor in the combination pen and scanner head 10 in order to detect, in step 48, the presence of yellow, cyan, magenta and black dots. The scanning is performed as the combination pen and scanner head 10 reciprocates along the scan axis and as the print media is advanced along the paper axis. In step 50 the microprocessor of the printer performs a centroid calculation, and then transmits dot position, dot size and/or spectral information data serially to a host personal computer (not illustrated) in step 52. This information can be transmitted to the host personal computer as serial data through means time shared with the pen printing data buses. The centroid calculation determines the location of the geometric center of a given dot. The personal computer then uses a special program to adjust the firing commands for the different nozzles along the scan axis and the paper axis to improve image quality. This can include adjusting which five hundred and twelve out of five hundred and twenty-four nozzles in the nozzle plate 20 fire ink to slightly move dot position along the paper axis. This can be advantageous in aligning adjacent pens. The timing of the firing commands is adjusted to affect the position of the dots. Alternatively, the special firing command adjustment program could be executed by the microprocessor of the thermal inkjet printer if that device has sufficient processing speed and capacity.

Thus we have also provided a method of improving print quality in a thermal ink jet printer by inserting a combination pen and optical scanner head into a carriage of the printer that reciprocates along a scan axis. A sheet of print media is propelled through the printer along a paper axis. A predetermined test pattern of dots of different ink colors is printed onto the print media using either the combination pen and scanner head 10 or another pen mounted on the cartridge. Predetermined dot position, dot size and/or spectral information is compiled by scanning both the color and location of the dots of the test pattern using the combination pen and optical scanner head. Predetermined ink jet firing commands are corrected in accordance with pre-programmed parameters based on the compiled dot position, dot size and/or spectral information in order to improve print quality. The method can be modified to allow substantially simultaneous printing and scanning of normal user generated text and/or graphics, and the making of corrections on the fly.

The present invention also provides a method of scanning a document for facsimile transmission or storage with a pen and printing with the same pen. According to our method, a combination pen and optical scanner head is mounted on the carriage of a printer for reciprocation along a scan axis. A first sheet of print media bearing pre-printed information is propelled through the printer along a paper axis. While the first sheet of print media is being propelled along the paper axis, the combination pen and optical scanner head is reciprocated along the scan axis, and the information printed on the first sheet of print media is optically scanned. A data file representing an image of the information scanned is created for either facsimile transmission or storage. A second sheet of print media is then propelled through the printer along the paper axis. At the same time, the combination pen and optical scanner head is reciprocated along the scan axis and user-designated information is printed onto the second sheet of print media.

The present invention also allows an optically scannable pre-printed media type identifier, such as a bar code, to be read by a thermal ink jet printer to determine if the media-type is compatible with the pen of the thermal inkjet printer. Certain paper types will not have the appropriate ink absorbency or other properties to enable a quality image to be printed with the type of inks utilized by the pen. With the combination ink jet pen and scanner head 10 of the present invention, this problem can be avoided. A bar code or other media-type identifier is pre-printed on the paper, preferably in flourescent ink or yellow ink that is not readily visible to the naked eye. The identifier is preferably printed adjacent the leading edge of the paper in advance in a separate printer not equipped with our combination pen and scanner head 10. When the paper is fed through a second printer equipped with our invention, the media-type identifier is initially read by the combination pen and scanner head 10. If the microprocessor of the second printer determines that the paper is incompatible and/or inappropriate for printing with the ink utilized by the combination pen and scanner head 10, an LED or LCD or other visual indicator on the second printer can be illuminated to warn the user of this condition. The second printer could also give an audible warning. Alternately, a warning message could be displayed or audibly indicated by the personal computer connected to the second printer. If the microprocessor of the second printer determines that the pen is compatible with the print media, it can make adjustments to the firing commands to optimize print quality for the type of print media detected, such as adjusting dry time or ink usage.

The present invention also enables a method of readily determining the incremental paper advance distance through a thermal ink jet printer to allow for adjustments that optimally nest the print swaths. Various types of paper have different thicknesses. A thicker sheet of paper, when propelled over a drive roller within a printer, will increase the effective radius of the drive roller, thereby increasing the advance distance as paper is incrementally propelled through the printer. Typically, the paper is advanced in very minute increments in rapid sequence. If the advance distance is too great, then the swaths of dots printed by the pen will be too far apart, adversely affecting print quality. If the advance distance is too small, then the swaths of the dots printed by the pen begin to overlap, which can adversely affect the quality of the print and/or consume excessive amounts of ink. Accordingly, with the present invention, it is possible to print and scan successive lines or swaths of dots in flourescent ink or yellow ink not visible to a user, on the header of a piece of paper before the text and/or graphics selected by the user begin to print. The scanning portion of the combination pen and scanner head 10 can simultaneously detect the relative location of the rows of dots printed in successive swaths and can adjust the incremental paper advance distance through the printer in accordance with pre-programmed criteria in order to optimize the print quality and/or minimize wastage of ink. The incremental paper advance distance is calculated based on the on the number of uniform predetermined micro-advances between the detection of successive lines of dots.

Our invention also permits a thermal inkjet printer to determine whether or not any of its nozzles are not firing at all, by looking for the absence of a dot after one should have been fired. If this has been determined, then firmware within the combination pen and scanner head 10 or software driver in the personal computer can allocate firing through alternative nozzles which are still operative.

While we have described a preferred embodiment of our combination pen and scanner head and various advantageous methods of using the same, it will be apparent to those skilled in the art that our invention can be modified in both arrangement and detail Therefore, the protection afforded our invention should only be limited in accordance with the following claims:

What is claimed is:

1. A combination ink jet pen and optical scanner head comprising:

a housing;

a thermal ink jet print assembly mounted in the housing and including a transparent nozzle plate for forming a plurality of ink dots on a sheet of print media adjacent to the assembly;

light means mounted in the housing for illuminating the print media including a light source and first lens means formed in the transparent nozzle plate for receiving light from the light source and diffusing the light onto a predetermined region of the print media;

sensor means mounted in the housing for receiving light reflected from the print media and generating electrical signals representative thereof; and second lens means formed in the transparent nozzle plate for gathering light reflected from the media and focusing the light onto the sensor means.

2. The combination ink jet pen and optical scanner head of claim 1 wherein the sensor means includes a color detection active pixel sensor.

3. The combination ink jet pen and optical scanner head of claim 1 wherein the sensor means comprises at least one CMOS light sensor.

4. The combination ink jet pen and optical scanner head of claim 1 wherein the light source is selected from the group consisting of an LED, an electro-luminescent device, a laser diode and a flourescent light.

5. The combination ink jet pen and optical scanner head of claim 1 wherein the first lens means is a fresnel lens.

6. The combination ink jet pen and optical scanner head of claim 1 wherein the second lens means is a fresnel lens.

7. The combination ink jet pen and optical scanner head of claim 1 wherein the transparent nozzle plate includes interconnect circuitry.

8. The combination ink jet pen and optical scanner head of claim 1 wherein the transparent nozzle plate is formed in a first leg of a transparent L-shaped circuit board, and a plurality of conductive pads are formed on a second leg of the L-shaped transparent circuit board.

9. The combination ink jet pen and optical scanner head of claim 8 wherein the light source conveys light through the second leg of the L-shaped transparent circuit board to the first lens means.

10. The combination ink jet pen and optical scanner head of claim 1 wherein the sensor means is formed in a silicon chip mounted on the transparent nozzle plate and forming a part of the thermal ink jet print assembly.

* * * * *